3,281,476
PREPARATION OF ETHERS OF POLYHYDRIC ALCOHOLS
Stone D. Cooley and Max O. Robeson, both of Corpus Christi, Tex., assignors to Celanese Corporation of America, New York, N.Y., a corporation of Delaware
No Drawing. Filed Jan. 23, 1962, Ser. No. 168,257
7 Claims. (Cl. 260—615)

This invention relates to a process for preparing ethers of polyhydric alcohols. It more particularly refers to a catalytic process for transetherifying polyhydric alcohols.

The products of the process of this invention have utility in the preparation of surface coatings and as crosslinking agents for polyester resins. "Polyhydric alcohols" as used herein is intended to encompass glycols and polyols such as for example trimethylolethane, anhydroenneaheptitol, pentaerythritol, trimethylolpropane, glycerine and neopentyl glycol.

This invention includes as one of its aspects the transetherification of a polyallyl ether of a polyhydric alcohol with an unetherified polyhydric alcohol in contact with a catalyst to form lower allyl ethers of said polyhydric alcohol.

More particularly, this invention includes the transetherification of unetherified polyhydric alcohol with a diallyl ether of a polyhydric alcohol to produce monoallyl ether of a polyhydric alcohol. Utilizing trimethylolpropane as exemplary of polyhydric alcohols, diallyl ether of trimethylolpropane can be transetherified to monoallyl ether of trimethylolpropane by reacting together the dietherified and unetherified compounds at about 50 to 80° C. in the presence of a suitable catalyst. At these temperatures the reaction time is suitably about 1 to 10 hours, preferably 2 to 5 hours. The mole ratio of the transetherification reactants is not critical. Either the polyhydric alcohol or the etherified polyhydric alcohol can be used in excess, or they may be used at a mole ratio of unity. Suitably the reactant mole ratios can range from about 0.5 to 1 to 2 to 1, preferably 1 to 1 polyhydric alcohol to etherified polyhydric alcohol. In order to minimize separation of products upon completion of the transetherification, it is desirable to utilize the same polyhydric alcohol as both the free alcohol and the etherified alcohol. This is not essential, however, and if desired a mixed product can be obtained through the use of a free alcohol which is different than the alcoholic moiety of the polyetherified alcohol. Similarly, triallyl ether of pentaerythritol can be transetherified with pentaerythritol to produce mono- and diallyl ether of pentaerythritol.

Another aspect of this invention includes the transetherification of polyhydric alcohols with allyl ether. For example trimethylolpropane can be transetherified with diallyl ether in contact with an appropriate catalyst to yield a mixture of monoallyl ether of trimethylolpropane and diallyl ether of trimethylolpropane. The reaction is an equilibrium one and can be made to proceed further toward either the mono- or the di-product by varying the proportion of the reactants. Conversion to the diether is encouraged by increasing the ratio of diallyl ether reactant to polyhydric alcohol reactant. Suitable reactant mole ratios are between about 3 to 1 and 4 to 1, ether to alcohol under substantially the same reaction conditions as specified above for the transetherification reaction of a polyhydric alcohol with a polyallyl ether of a polyhydric alcohol. Similarly, a polyhydric alcohol can be etherified by a mixture of allyl alcohol and diallyl ether or by allyl alcohol alone.

It is desirable to keep the water content of the etherification reaction as low as possible since the presence of water tends to drive the reaction toward the alcohols and away from the ethers. Water can be removed by azeotropic distillation during the etherification with such materials as cyclohexane or diallyl ether. Another convenient process is to remove all water prior to addition of the catalyst to the system, as by refluxing with an extractant and decanting the resulting two phase system or by azeotropic distillation prior to adding the reactants to the reaction with such compounds as benzene or xylene.

Catalysts which are useful in this invention include the combination of boron trifluoride and: mercury, mercuric oxide, mercuric acetate, silver acetate, mercury acetyl acetonate and antimony trioxide. Other useful catalysts are zinc chloride and sodium methoxide. Of these catalysts, the combination of boron trifluoride and mercuric acetate has been found to be by far the most effective. This catalyst combination is suitably added to the etherification reaction mixture with the boron trifluoride in liquid form (as an adduct with diethyl ether or tetrahydrofuran for example, while the mercuric acetate is generally added in salt form. It is preferred to use at least about 0.007 mole boron trifluoride per mole of polyhydric alcohol with an optimum quantity being between about 0.007 and 0.019 mole per mole. Mercuric acetate should be present at at least about 0.002 mole per mole of polyhydric alcohol, preferably 0.003 to 0.019 mole per mole.

In the course of the etherification reaction, the mercuric acetate catalyst becomes spent and precipitates as a gray colloidal mass. It has been found that substantially all of the mercury in the system can be recovered by the simple expedient of heating to about 100 C., which converts the spent catalyst to metallic mercury which metal can be readily recovered by decantation. It has also been found that the metallic mercury can be reoxidized to mercuric acetate by reaction with either peracetic acid or acetic acid and hydrogen peroxide. The mercuric acetate catalyst can be easily isolated by crystallization or it can be readmitted to the etherification reaction system in solution provided the solution is substantially anhydrous. It has been found that operating the mercuric acetate recovery and regeneration process in the anhydrous condition, the processing time is reduced from a reported 7 hours for an aqueous system to 1.5 hours. Recovery and regeneration yields have been found to be about 95% with some runs producing 98% recovery.

This process also envisions a continuous method of producing monoallyl ether of trimethylolpropane by mixing trimethylolpropane with diallyl ether of trimethylolpropane, passing the mixture into contact with mercuric acid-boron trifluoride catalyst solution, removing the reaction products and spent catalyst, separating trimethylolpropane, monoallyl ether of trimethylolpropane and diallyl ether of trimethylolpropane by distillation, recycling the trimethylolpropane and the diallyl of trimethylolpropane, heating the spent catalyst to form mercury metal, oxidizing the mercury to mercuric acetate, and recycling the mercuric acetate to the reaction solution.

The following specific examples will serve to further illustrate this invention but are in no way limiting thereon. Proportions are expressed in parts by weight unless specified to the contrary.

*Example 1*

A mixture of 15 parts of mercury, 40 parts of glacial acetic acid and 0.1 part boron trifluoride was charged to to a reactor. To this charge was added 8 parts of 50% hydrogen peroxide over a 5-minute time interval during which the reactor temperature was maintained at 20 to 40° C. During the 45-minute period following peroxide addition mercurous acetate percipitated, and subsequent heating to 80° C. for an additional 45 minutes converted the precipitate into soluble mercuric acetate which when thoroughly dried gave 23.1 parts of product, a yield of 98% of theoretical.

*Examples II through V*

These examples are given in tabular form below for various reactions. In each case the reaction proceeded at 50 to 60° C. for 5 to 6 hours.

| Example Number | II | III | IV | V |
|---|---|---|---|---|
| Reactants (moles): | | | | |
| TMP [a] | 1.5 | 3 | 1.5 | 3 |
| DAE-TMP [b] | 1.5 | | | |
| Allyl alcohol | | 3 | | 2 |
| Diallyl ether | | | 1.5 | 1 |
| Catalyst (moles): | | | | |
| Mercuric acetate | 0.006 | 0.006 | 0.003 | 0.009 |
| Boron trifluoride | 0.03 | 0.03 | 0.03 | 0.03 |
| Products (moles): | | | | |
| DAE-TMP [b] | 0.92 | 0.14 | 0.16 | 0.25 |
| MAE-TMP [c] | 1.15 | 0.86 | 0.65 | 1.19 |

[a] TMP = trimethylolpropane.
[b] DAE-TMP = Diallyl ether of trimethylolpropane.
[c] MAE-TMP = Monoallyl ether of trimethylolpropane.

In each example the products were separated by fractionation with diallyl ether of trimethylolpropane coming off at 161 to 170° C. and monoallyl ether of trimethylolpropane coming off at 180° to 185° C.

It should be understood that while this invention has been exemplified by the reaction of trimethylolpropane with trimethylolpropane allyl ethers, allyl ethers and allyl alcohol, this invention is not limited to these reactants. Thus, substantially any polyhydric alcohol is adapted to use in this invention. Further, it should be understood that the ether products of this invention may be further reacted to yield other products. For example, by hydrogenating allyl ethers of trimethylolpropane at about 100° C. with a hydrogen pressure of about 1000 p.s.i.g. over a Raney nickle catalyst propyl ethers of trimethylolpropane are produced.

It is to be understood that the foregoing detailed description is given merely by way of illustration and that many variations may be made therein without departing from the spirit of our invention.

Having described our invention what we desire to secure by Letters Patent is:

1. A process of forming an allyl ether of a polyhydric alcohol selected from the group consisting of, neopentyl glycol, pentaerythritol, trimethylolethane, trimethylolpropane, and anhydroenneaheptitol, which process comprises reacting said polyhydric alcohol with a polyallyl ether of said polyhydric alcohol at about 50° C. to 80° C. in contact with a mercuric acetate-boron trifluoride catalyst under substantially anhydrous conditions.

2. A process as claimed in claim 1 wherein said polyhydric alcohol is trimethylolpropane.

3. A process as claimed in claim 1 wherein said polyhydric alcohol is pentaerythritol.

4. A process as claimed in claim 1 wherein said polyhydric alcohol is anhydroenneaheptitol.

5. A process as claimed in claim 1 wherein said polyhydric alcohol is trimethylolethane.

6. A process as claimed in claim 1 wherein said polyhydric alcohol is neopentyl glycol.

7. A continuous process for producing monoallyl ether of trimethylolpropane which process comprises mixing trimethylolpropane with diallyl ether of trimethylolpropane in a mole ratio of 0.5:1 to 2:1; contacting said mixture with mercuric acetate-boron trifluoride catalyst at about 50° C. to 80° C., removing the reaction products and spent catalyst; separating trimethylolpropane, monoallyl ether of trimethylolpropane and diallyl ether of trimethylolpropane by distillation; recycling said trimethylolpropane and said diallyl ether of trimethylolpropane; heating said spent catalyst to about 100° C. to form mercury metal; oxidizing said mercury to mercuric acetate in the presence of an oxidant selected from the group consisting of peracetic acid and acetic acid and hydrogen peroxide; and recycling said mercuric acetate.

References Cited by the Examiner

UNITED STATES PATENTS

| | | | |
|---|---|---|---|
| 1,096,667 | 5/1914 | Baum et al. | 260—605 |
| 1,151,929 | 8/1915 | Duden et al. | 260—605 |
| 1,310,743 | 7/1919 | Dreyfus | 260—605 |
| 1,436,550 | 11/1922 | Trevoux | 260—605 |
| 2,303,279 | 11/1942 | Isham | 260—605 |
| 2,661,360 | 12/1953 | Greenspan | 260—431 |
| 2,758,098 | 8/1956 | Haensel | 252—416 |
| 2,760,990 | 8/1956 | Watanabe et al | 260—615 X |
| 2,847,477 | 8/1958 | Wantanabe et al. | 260—615 X |
| 2,847,478 | 8/1958 | Hwa et al. | 260—615 X |
| 2,873,289 | 2/1959 | MacKellar | 260—431 |
| 2,879,232 | 3/1959 | Malo et al. | 252—416 |
| 3,020,316 | 2/1962 | Thomas et al. | 260—615 |
| 3,069,475 | 12/1962 | Sidi | 260—615 |

LEON ZITVER, *Primary Examiner.*

B. HELFIN, H. T. MARS, *Assistant Examiners.*